(12) United States Patent
Sundberg et al.

(10) Patent No.: US 9,463,822 B2
(45) Date of Patent: Oct. 11, 2016

(54) STROLLER

(71) Applicant: Dorel Juvenile Group, Inc., Foxboro, MA (US)

(72) Inventors: Brian C Sundberg, Chester, NH (US); Kurt Nygren, Harvard, MA (US); Walter S Bezaniuk, Berkley, MA (US); Joseph D Langley, Foxboro, MA (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 15 days.

(21) Appl. No.: 14/593,996

(22) Filed: Jan. 9, 2015

(65) Prior Publication Data
US 2015/0197269 A1 Jul. 16, 2015

Related U.S. Application Data

(60) Provisional application No. 61/971,278, filed on Mar. 27, 2014, provisional application No. 61/926,129, filed on Jan. 10, 2014.

(51) Int. Cl.
*B62B 7/10* (2006.01)
*B62B 9/12* (2006.01)

(52) U.S. Cl.
CPC .. *B62B 9/12* (2013.01); *B62B 7/10* (2013.01)

(58) Field of Classification Search
CPC ............ B62B 7/06; B62B 7/062; B62B 7/10
USPC ......................................... 280/642, 647, 650
See application file for complete search history.

(56) References Cited

U.S. PATENT DOCUMENTS

| | | | | |
|---|---|---|---|---|
| 3,084,949 | A | * | 4/1963 | Forster .................... B62B 7/068 280/47.371 |
| 4,216,974 | A | * | 8/1980 | Kassai .................... B62B 7/062 280/42 |
| 4,765,645 | A | | 8/1988 | Shamie |
| 5,460,399 | A | | 10/1995 | Baechler et al. |
| 5,599,033 | A | | 2/1997 | Kolbus et al. |
| 6,428,034 | B1 | | 8/2002 | Bost |
| 6,682,090 | B2 | | 1/2004 | Chen |
| 6,976,697 | B2 | | 12/2005 | Britton et al. |
| 6,981,709 | B2 | * | 1/2006 | Saint ........................ B62B 9/02 280/43 |

(Continued)

FOREIGN PATENT DOCUMENTS

| | | |
|---|---|---|
| EP | 1323614 A1 | 7/2003 |
| KR | 20-0196566 Y1 | 9/2000 |

OTHER PUBLICATIONS

PCT International Search Report and Written Opinion mailed Sep. 1, 2015 and issued in connection with PCT/US2015/010977.

*Primary Examiner* — Jeffrey J Restifo
(74) *Attorney, Agent, or Firm* — Barnes & Thornburg LLP

(57) ABSTRACT

A compact collapsible stroller includes a mobile base provided with front and rear wheels. A push handle is coupled to the mobile base.

19 Claims, 6 Drawing Sheets

(56) References Cited

U.S. PATENT DOCUMENTS

| | | | |
|---|---|---|---|
| 7,168,728 B2 | 1/2007 | Suga et al. | |
| 7,229,091 B2 * | 6/2007 | Lan | B62B 7/10 |
| | | | 280/47.38 |
| 7,341,265 B1 | 3/2008 | Liu | |
| 7,434,827 B2 | 10/2008 | Yeh et al. | |
| 7,562,895 B2 * | 7/2009 | Santamaria | B62B 7/068 |
| | | | 280/47.38 |
| 7,770,911 B2 | 8/2010 | Dotsey et al. | |
| 8,205,907 B2 | 6/2012 | Chicca | |
| 8,684,396 B1 * | 4/2014 | Hanson | A61G 5/08 |
| | | | 280/47.4 |
| 8,882,134 B2 * | 11/2014 | Rolicki | B62B 7/04 |
| | | | 280/642 |
| 8,894,090 B1 | 11/2014 | Chen | |
| 9,108,660 B2 * | 8/2015 | Sundberg | B62B 7/10 |
| 9,308,929 B1 * | 4/2016 | Dowd | B62B 7/062 |
| 2003/0057681 A1 * | 3/2003 | Lan | B62B 9/087 |
| | | | 280/642 |
| 2005/0127640 A1 | 6/2005 | Worth et al. | |
| 2006/0273552 A1 * | 12/2006 | Lan | B62B 7/10 |
| | | | 280/642 |
| 2006/0273553 A1 * | 12/2006 | Lan | B62B 7/10 |
| | | | 280/642 |
| 2012/0025491 A1 | 2/2012 | Li | |
| 2012/0098237 A1 * | 4/2012 | Winterhalter | B62B 7/008 |
| | | | 280/647 |
| 2013/0113189 A1 | 5/2013 | Doucette et al. | |
| 2013/0140797 A1 | 6/2013 | Fritz et al. | |
| 2015/0197270 A1 * | 7/2015 | Sundberg | B62B 9/12 |
| | | | 280/642 |
| 2015/0307120 A1 * | 10/2015 | Sundberg | B62B 7/062 |
| | | | 280/642 |

\* cited by examiner

STROLLER

PRIORITY CLAIM

This application claims priority under 35 U.S.C. §119(e) to U.S. Provisional Application Ser. No. 61/971,278, filed Mar. 27, 2014 and Ser. No. 61/926,129, filed Jan. 10, 2014, both of which are expressly incorporated by reference herein.

BACKGROUND

The present disclosure relates to collapsible strollers for juveniles, and particularly to strollers including a frame assembly, a seat, and several wheels. More particularly, the present disclosure relates to a collapsible and expandable frame assembly for a juvenile stroller.

SUMMARY

A compact collapsible stroller in accordance with the present disclosure includes a mobile base provided with front and rear wheels. A push handle is coupled to the mobile base in illustrative embodiments.

In illustrative embodiments, the mobile base is foldable at the option of a caregiver using a foot-actuated base opener during controlled collapse of the collapsible stroller. The mobile base includes a rolling rear-leg unit and a rolling front-leg unit that can be moved away from a folded position that is located alongside the rolling rear-leg unit and associated with a collapsed storage mode of the stroller to an unfolded position that is associated with an expanded use mode of the stroller when the mobile base is unfolded so that a child can be seated on a juvenile seat coupled to the mobile base. In some illustrative embodiments, the rolling rear-leg and front-leg units pivot about a common pivot axis during folding and unfolding of the mobile base.

In illustrative embodiments, the stroller includes a foot-actuated base opener coupled to the rolling front-leg and rear-leg units of the mobile base. A caregiver operates the foot-actuated base opener to initiate folding of the mobile base and change the stroller from a collapsed storage mode to an expanded use mode by stepping on a foot pedal included in the foot-actuated base opener and moving the foot pedal toward the ground underlying the mobile base. This downward movement of the foot pedal causes the rolling front-leg unit to move away from the folded position located alongside the rolling rear-leg unit to the unfolded position associated with the expanded use mode of the stroller.

In illustrative embodiments, the foot-actuated base opener includes a spreader mover including a foot pedal and a leg spreader coupled to the spreader mover to move therewith. The leg spreader is also coupled to the rolling front-leg and rear-leg units. Downward movement of the foot pedal included in the spreader mover in response to application of a downward force by a caregiver to the foot pedal causes the leg spreader to move the rolling front-leg unit relative to the rolling rear-leg unit about a single (common) horizontal leg-pivot axis away from the folded position located alongside the rolling rear-leg unit to the unfolded position associated with the expanded use mode of the stroller in illustrative embodiments.

In some illustrative embodiments, the leg spreader of the foot-actuated base opener is a mechanical linkage that is located below the juvenile seat and below the single (common) horizontal leg-pivot axis. The leg spreader comprises a leg driver including a front-leg driver coupled to the rolling front-leg unit and a rear-leg driver coupled to the rolling rear-leg unit. The leg spreader also comprises a coupling associated with the leg driver and arranged to establish several pivot axes. An outer portion of the front-leg driver is coupled to the rolling front-leg unit for pivotable movement about a front pivot axis. An outer portion of the rear-leg driver is coupled to the rolling rear-leg unit for pivotable movement about a rear pivot axis that is parallel to the front pivot axis. Inner portions of the front-leg and rear-leg drivers are coupled to one another for relative movement about a middle pivot axis that lies between and is parallel to each of the front and rear pivot axes and that lies below the single (common) horizontal leg-pivot axis. The front-leg and rear-leg drivers pivot relative to one another about the middle pivot axis as the mobile base is unfolded and folded.

The spreader mover of the foot-actuated base opener is coupled to the leg driver of the leg spreader to pivot about the middle pivot axis in response to foot movement of a caregiver. The spreader mover is formed to include one or two foot pedals arranged to be accessed and used by a caregiver when the mobile base is folded and the stroller is in the collapsed storage mode to cause the leg spreader to move so that the mobile base is unfolded and the stroller is changed to the expanded use mode.

Downward movement of the foot pedal and spreader mover in response to a downward force applied to the foot pedal by the foot of a caregiver moves the leg spreader relative to the front-leg and rear-leg units and causes a folded mobile base of a stroller to unfold to change the mode of the stroller from collapsed storage mode to expanded use mode. In use, while the mobile base is folded and the stroller is in the collapsed storage mode, a caregiver desiring to change the stroller to the expanded use mode steps on one of the foot pedals included in the spreader mover and pushes downwardly on the foot pedal to pull the inner portions of the pivotable front-leg and rear-leg drivers downwardly simultaneously to cause outer portions of the front-leg and rear-leg drivers to move away from one another. Such spreading apart of the front-leg and rear-leg drivers causes the rolling front-leg unit to pivot relative to the rolling rear-leg unit about a single (common) horizontal leg-pivot axis and away from the rolling rear-leg unit and begin to unfold the mobile base. This foot pressure is applied by the caregiver until the front and rear wheels in the rolling front-leg and rear-leg units are spread far enough apart to unfold the mobile base fully and therefore cause the stroller to be converted to expanded use mode.

A pedal-return spring is also included in illustrative embodiments of the foot-actuated base opener. In some illustrative embodiments, the pedal-return spring is coupled to the rear-leg driver of the spreader mover and configured normally to apply a torque to the pivotable spreader mover to urge the spreader mover (and its foot pedals) to lie out of the way and alongside the rolling rear-leg unit. In such a ready-to-use retracted position, the foot pedal is nevertheless accessible and usable by a caregiver desiring to step on the foot pedal to unfold the mobile base to convert the stroller to the expanded use mode.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 3:
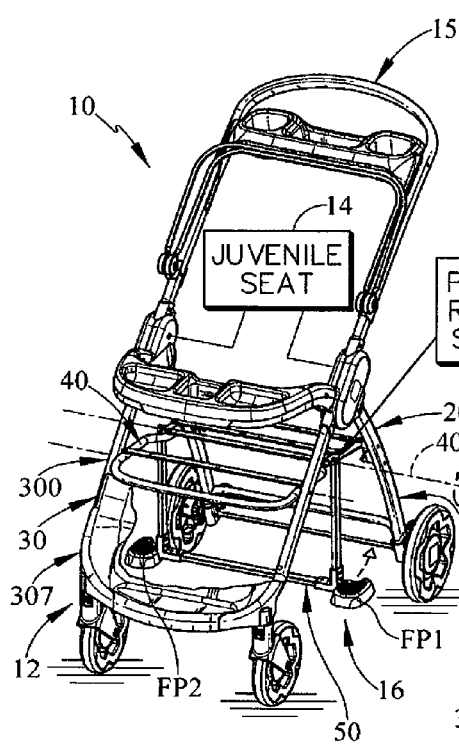
FIG. 3 is a view similar to FIGS. 1 and 2 showing the stroller in an illustrative expanded use mode and showing that the spreader mover has been moved by the foot of a caregiver from a ready-to-use retracted position shown in FIG. 2 to hang (temporarily) in a vertical orientation midway between the front-leg and rear-leg units during unfolding of the mobile base and suggesting that a pedal-return spring is provided to apply a counterclockwise torque to the spreader mover to rotate the spreader mover about a horizontal pivot axis in a rearward direction toward the rolling rear-leg unit and the ready-to-use retracted position alongside the rolling rear-leg unit once the caregiver steps off of the foot pedal included in the spreader mover.
Figure 4:
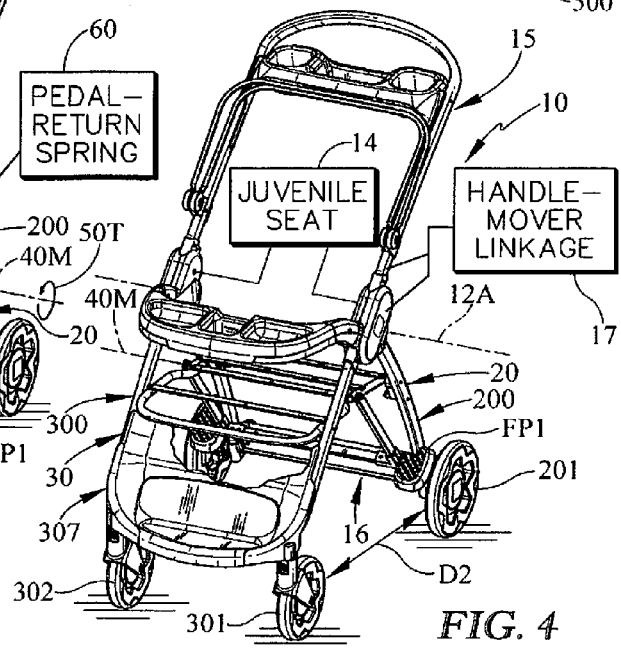
FIG. 4 is a view of the stroller of FIG. 3 also in the expanded use mode but after the pedal-return spring has moved the spreader mover rearwardly about the horizontal pivot axis to engage the rolling rear-leg unit and assume a ready-to-use retracted position arranged to lie alongside the rolling rear-leg unit.

A collapsible stroller 10 in accordance with a first embodiment of the present disclosure includes a mobile base 12, a juvenile seat 14 coupled to mobile base 12, and a push handle 15 coupled to mobile base 12 as suggested in FIG. 4. Stroller 10 includes a foot-actuated base opener 16 for use by a caregiver to unfold mobile base 12 suggested in FIGS. 1-3 to change stroller 10 from a collapsed storage mode shown in FIG. 1 to an expanded use mode shown in FIG. 3. A collapsible stroller 10 in accordance with the present disclosure is shown diagrammatically in FIG. 8. A diagrammatic illustration of a collapsible stroller 210 in accordance with another embodiment of the present disclosure is shown in FIG. 9.

Figure 1:
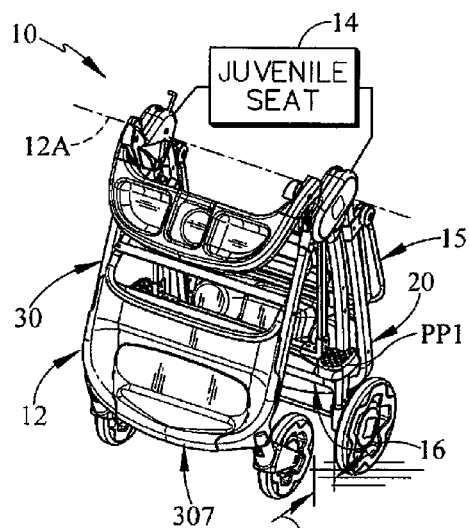
FIG. 1 is a perspective view of a collapsible stroller in accordance with a first embodiment of the present disclosure shown in an illustrative collapsed storage mode and showing that a mobile base including front and rear wheels has been moved to assume a folded position.

Mobile base 12 of stroller 10 includes a rolling rear-leg unit 20 and a rolling front-leg unit 30 coupled to rolling rear-leg unit 20 for pivotable movement about a single (common) horizontal leg-pivot axis 12A between a folded position associated with a collapsed storage mode of stroller 10 and shown in FIG. 1 and an unfolded position associated with an expanded use mode of stroller 10 and shown in FIG. 4. A foot-actuated base opener 16 is included in stroller 10 as suggested in FIG. 2 and configured to include a first foot pedal FP1 and to provide means for unfolding mobile base 12 to change mobile base 12 from the folded position shown in FIG. 1 to the unfolded position shown in response to application of a downward force F to first foot pedal FP1. A similar second foot pedal FP2 is provided on a far side of mobile base 12 as suggested in FIG. 3.

Mobile base 12 is configured to roll around and carry any suitable juvenile seat 14 as suggested in FIG. 4 and to fold when not in use to assume a folded position as suggested in FIG. 1. A caregiver can fold mobile base 12 by causing rolling front-leg unit 30 to pivot about leg-pivot axis 12A in a rearward (i.e. counterclockwise) direction toward rolling rear-leg unit 20. A caregiver can unfold mobile base 12 by causing rolling front-leg unit 30 to pivot about leg-pivot axis 12A in a forward (i.e. clockwise) direction way from rolling rear-leg unit 20 as suggested in FIGS. 1-3. Unfolding of mobile base 12 of stroller 10 is accomplished easily by applying a downward pedal-actuation force F to first foot pedal FP1 of foot-actuated base opener 16 as suggested in FIG. 2 until rolling front-leg unit 30 is pivoted about leg-pivot axis 12A in a clockwise direction away from rolling rear-leg unit 20. In illustrative embodiments, this unfolding of mobile base 12 also causes push handle 15 to pivot about leg-pivot axis 12A in a counterclockwise direction from a stowed position shown in FIG. 1 toward a deployed position shown in FIG. 3 owing to provision of a handle-mover linkage 17 that is coupled to push handle 15 and mobile base 12 as suggested diagrammatically in FIGS. 4, 8, and 9.

Figure 5:
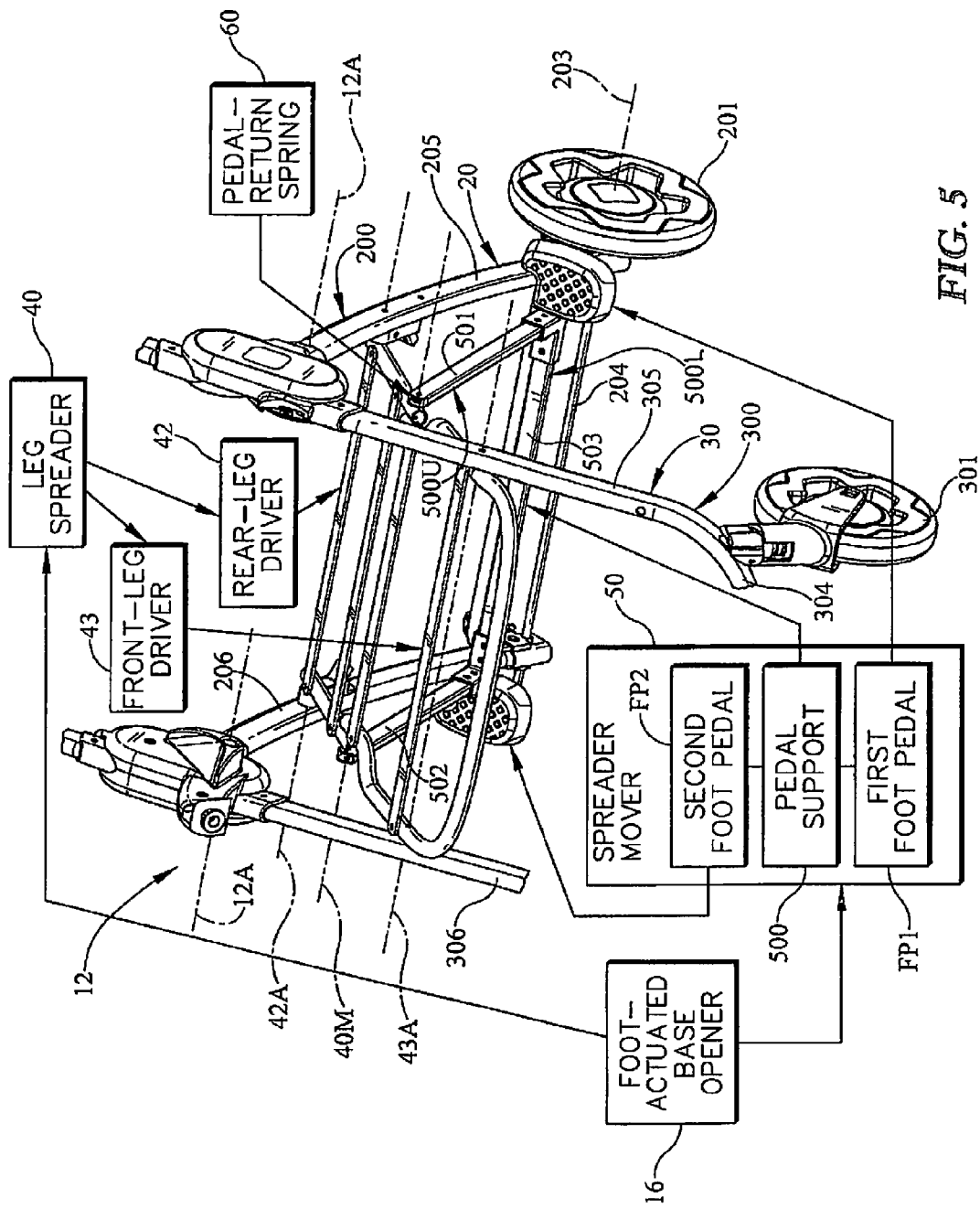
FIG. 5 is an enlarged view of a portion of the stroller of FIGS. 1-4 showing components included in the foot-actuated base opener in more detail.

Rolling rear-leg unit 20 of mobile base 12 includes a rear frame 200 arranged to intersect leg-pivot axis 12A and rear wheels 201, 202 mounted on rear frame 200 for rotation about an axis of rotation 203 as suggested in FIGS. 4 and 5. Rear frame 200 includes a horizontally extending rear strut 204 lying between rear wheels 201, 202 and extending along axis of rotation 203. Rear frame 200 also includes first and second rear legs 205, 206. First rear leg 205 is coupled to rear strut 204 to lie near first rear wheel 201 and second rear leg 206 is coupled to rear strut 204 to lie near second rear wheel 202.

Rolling front-leg unit 30 of mobile base 12 includes a front fame 300 arranged to intersect leg-pivot axis 12A and front wheels 301, 302 mounted on front frame 300 using a swivel mount in an illustrative embodiment. Front frame 200 includes a horizontally extending front strut 304 lying between front wheels 301, 302 and in generally parallel relation to rear strut 204. Front frame 300 also includes first and second front legs 305, 306. First front leg 305 is coupled to front strut 304 near first front wheel 301 and second front leg 306 is coupled to front strut 304 near second front wheel 301. A foot-rest panel 307 is coupled to front frame 300 in an illustrative embodiment as suggested in FIGS. 3 and 4.

Figure 2:
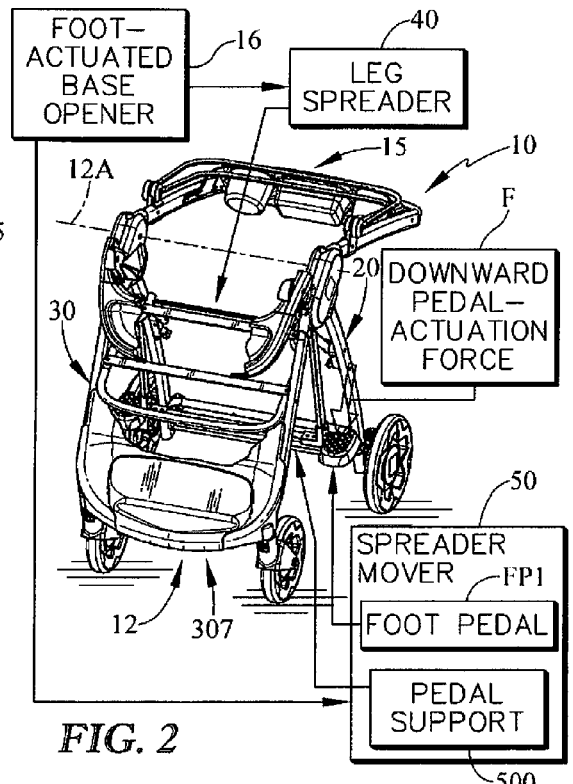
FIG. 2 is a view similar to FIG. 1 showing that the stroller includes a push handle and that the mobile base has a rolling front-leg unit including two front wheels and a rolling rear-leg unit including two rear wheels and showing that application of a downward pedal-actuation force by a caregiver to a foot pedal included in a spreader mover that is coupled to a leg spreader to form a foot-actuated base opener causes the front-leg unit to pivot relative to the rear-leg unit about a single (common) horizontal leg-pivot axis and move away from the rear-leg unit to unfold the folded mobile base so that the stroller can be converted to the expanded use mode shown in FIGS. 3 and 4 easily by a caregiver using only downward foot movement and suggesting that the push handle has pivoted about the single (common) horizontal leg-pivot axis from a stowed position shown in FIG. 1 toward a deployed position shown in FIG. 3 automatically in response to unfolding of the mobile base.

Foot-actuated base opener 16 includes a leg spreader 40 pivotably coupled to each of rear and front legs 205, 206, 305, 306 of mobile base 12 and a spreader mover 50 pivotably coupled to leg spreader 40 and formed to include first foot pedal FP1 and a second foot pedal FP2 as suggested in FIGS. 2, 3, and 5. When a caregiver steps on and pushes downwardly against first foot pedal FP1 (or second foot pedal FP2) of spreader mover 50, the spreader mover 50 moves downwardly to change the shape of leg spreader 40 and thus causes front legs 301, 302 to move away and spread apart from rear legs 201, 201 to unfold mobile base 12 and change stroller 10 from the collapsed storage mode to the expanded use mode as suggested in FIGS. 1-3. Such leg spreading takes place when front legs 301, 302 pivot about leg-pivot axis 12A and move away from rear legs 201, 202.

Leg spreader 40 of foot-actuated base opener 16 is a mechanical linkage that is located under juvenile seat 14 and includes a front-leg driver 43 and a rear-leg driver 42. An outer portion of front-leg driver 43 is coupled to rolling front-leg unit 300 for pivotable movement about a front pivot axis 43A. An outer portion of rear-leg driver 42 is coupled to rolling rear-leg unit 200 for pivotable movement about a rear pivot axis 42A that is parallel to the front pivot axis 43A. Inner portions of front-leg and rear-leg drivers 43, 42 are coupled to one another for relative movement about a middle pivot axis 40M that lies between and is parallel to each of the front and rear pivot axes 43A, 42A.

Spreader mover 50 of foot-actuated base opener 16 is coupled to one of the front-leg and rear-leg drivers 42, 43 to pivot about the middle pivot axis 40M as suggested in FIGS. 2-4. Spreader mover 50 is formed to include two foot pedals FP1, FP2 that are arranged to be accessed and used by a caregiver when mobile base 12 is folded and stroller 10 is in the collapsed storage mode to change stroller 10 to the expanded use mode. Spreader mover 50 also includes a pedal support 500 having an upper portion 500U pivotably coupled to spreader 40 to pivot about middle pivot axis 40M and a lower portion 500L coupled to first and second foot pedals FP1, FP2 as suggested in FIG. 5. In illustrative embodiments, pedal support 500 includes a first arm 501, a second arm 502, and a center strut 503 arranged to extend between and made with lower portions of each arm 501, 502. First foot pedal FP1 is coupled to one end of center strut 503 and second foot pedal FP2 is coupled to an opposite end of center strut 503. As suggested in FIG. 6, center strut 503 includes a first elbow 503A coupled to first arm 501 and first foot pedal FP1, a second elbow 503B coupled to second arm 502 and second foot pedal FP2, and a rod 503C interconnection first and second elbows 503A, 503B.

Figure 7:
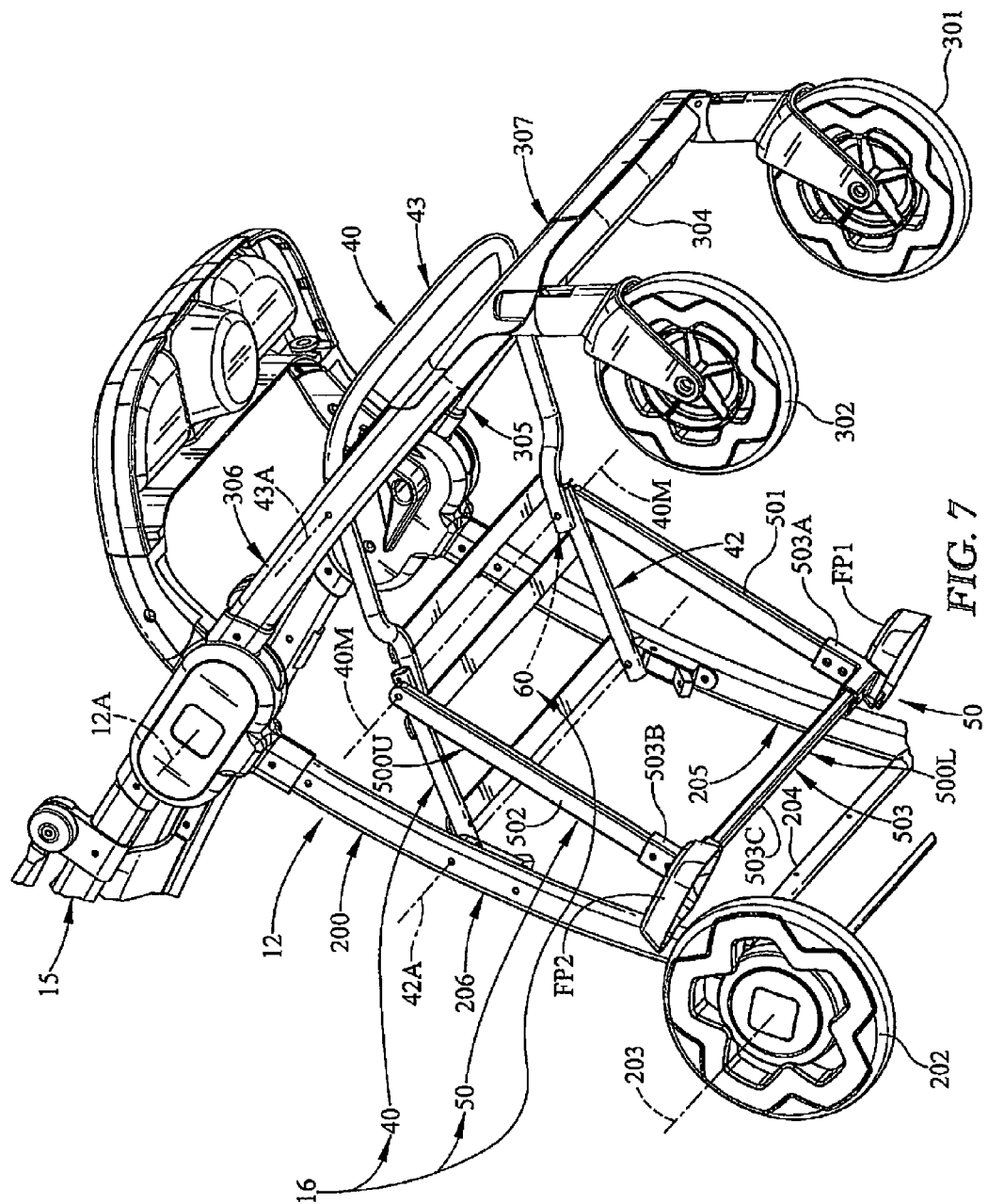
FIG. 7 is a perspective view of the underside of the stroller of FIGS. 1-5 showing the components illustrated in FIG. 6.

In use, while the mobile base 12 is folded and the stroller 10 is in the collapsed storage mode, a caregiver desiring to change the stroller 10 to the expanded use mode steps on one of the foot pedals FP1, FP2 included in spreader mover 50 and pushes downwardly on a foot pedal FP1 or FP2 to pull the inner portions of the front-leg and rear-leg drivers 43, 42 downwardly simultaneously to cause outer portions of the front-leg and rear-leg drivers 43, 42 to move away from one another. Such spreading apart movement of front-leg and rear-leg drivers 43, 42 of the leg spreader 40 causes the rolling front-leg unit 30 to pivot about the horizontal leg-pivot axis 12A and away from rolling rear-leg unit 20. This foot pressure is applied by the caregiver until the rolling front-leg and rear-leg units 30, 20 are spread apart to unfold mobile base 12 fully and therefore cause the stroller 10 to be converted to expanded use mode shown in FIGS. 3 and 7.

Figure 6:
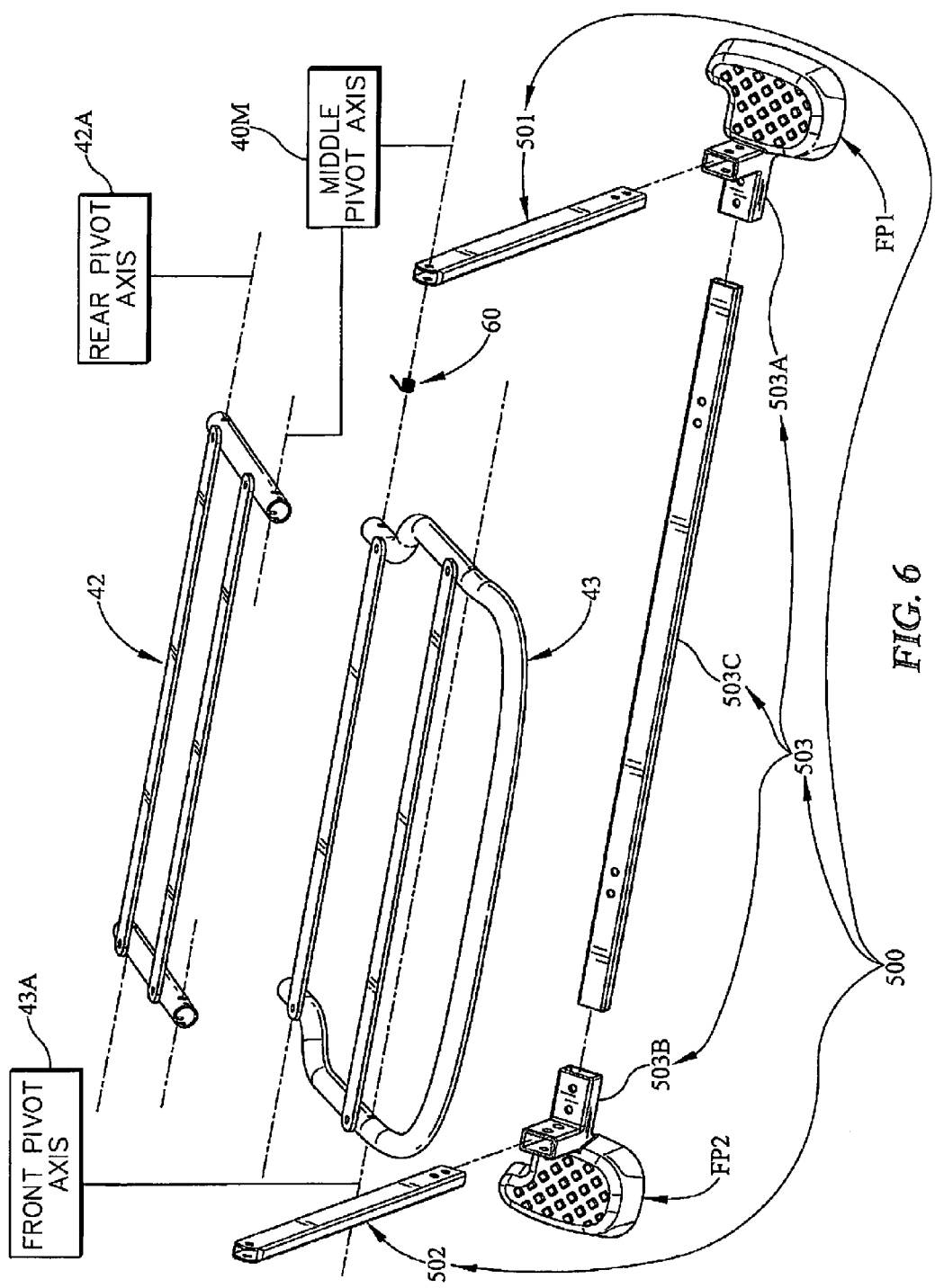
FIG. 6 is an enlarged exploded perspective assembly view of components included in the foot-actuated base opener shown in FIGS. 1-5.

A pedal-return spring 60 is also included in foot-actuated base opener 16 as suggested in FIGS. 3 and 6. Pedal-return spring 60 is coupled to spreader mover 50 in any suitable manner and configured normally to apply a torque 50T to the pivotable spreader mover 50 to urge spreader mover 50 (and its foot pedals FP1, FP2) to lie out of the way and alongside the rolling rear-leg unit 20. In such a ready-to-use retracted position, each of foot pedals FP1, FP2 is nevertheless accessible and usable by a caregiver desiring to step on the foot pedal to unfold mobile base 12 using foot action to convert stroller 10 from the collapsed storage mode shown in FIG. 1 to the expanded use mode shown in FIG. 3.

Figure 8:
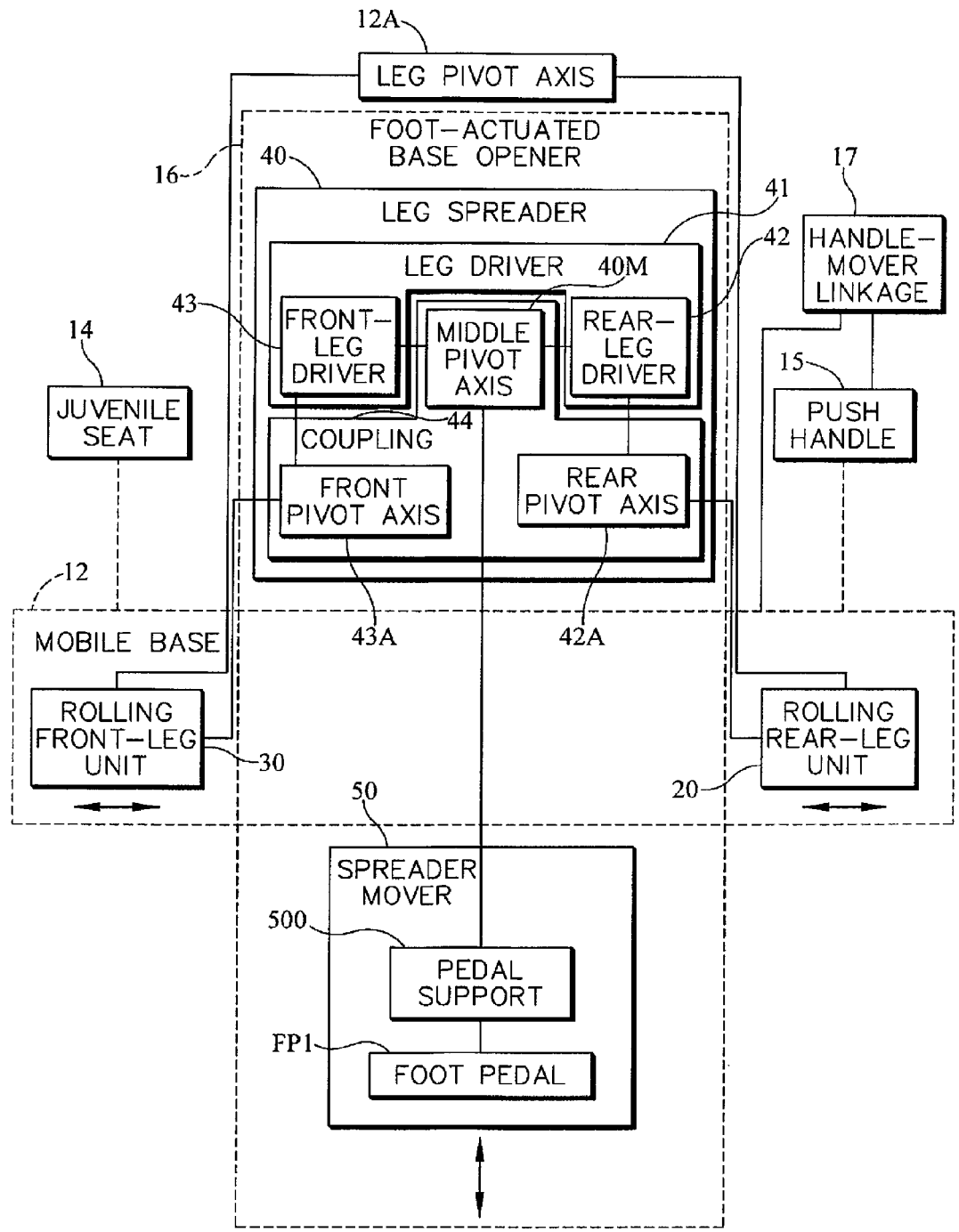
FIG. 8 is a diagrammatic view of a collapsible stroller in accordance with the present disclosure.
Figure 9:
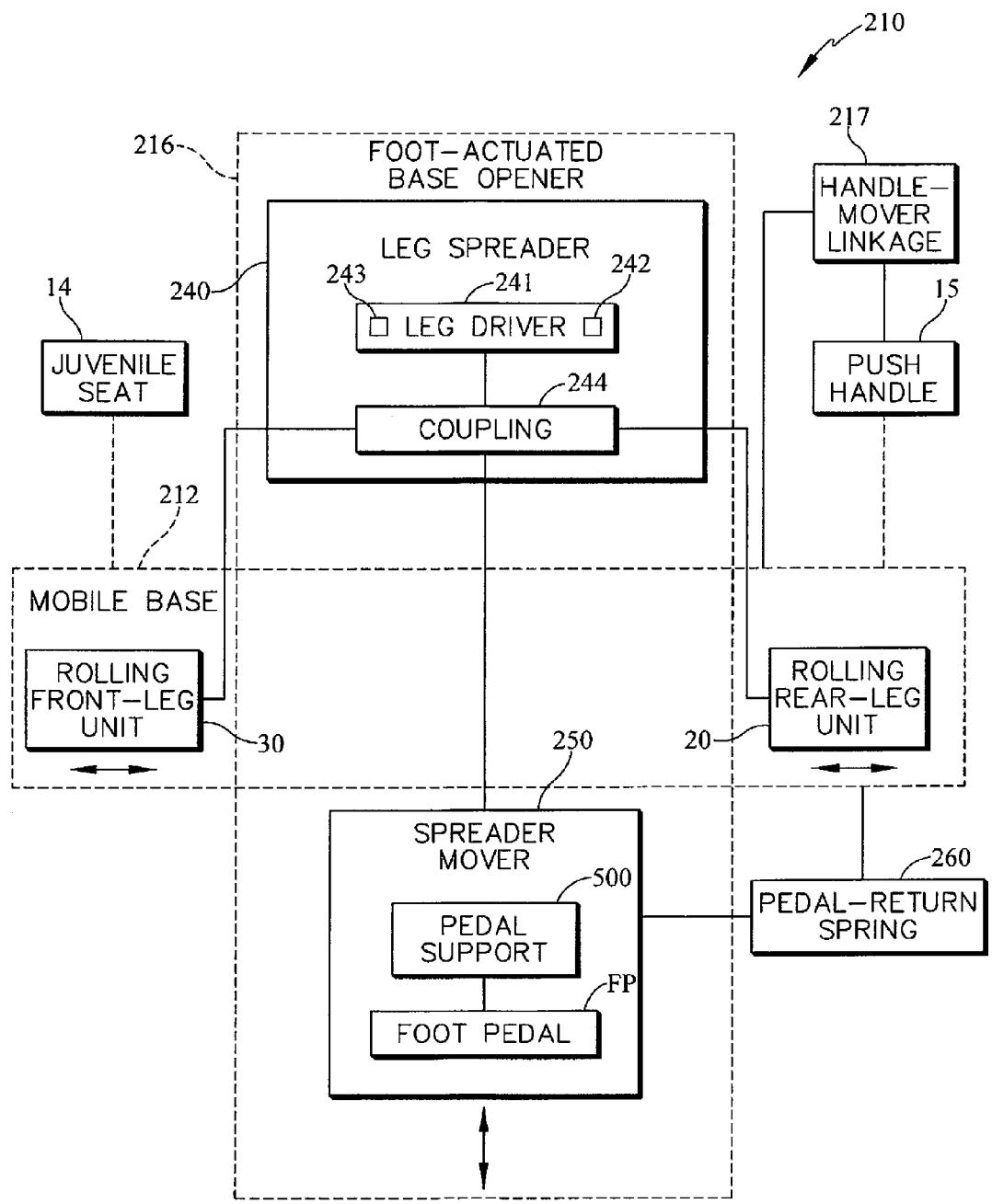
FIG. 9 is a diagrammatic view of a collapsible stroller in accordance with another embodiment of the present disclosure.

A collapsible stroller 10 comprises a mobile base 12, a juvenile seat 14, and a foot-actuated base opener 16 as suggested illustratively in FIGS. 1-4 and diagrammatically in FIG. 8. Foot-actuated base opener 16 is configured to be operated by a caregiver to open a collapsed stroller as suggested in FIGS. 2-4 by applying a downward force F to the foot-actuated base opener 16.

Mobile base 12 includes a rolling rear-leg unit 20 having rear wheels 201, 202 and a rolling front-leg unit 30 having front wheels 301, 302. Rolling front-leg unit 30 is mounted for folding movement relative to the rolling rear-leg unit 20 between a folded position alongside the rolling rear-leg unit 20 and associated with a collapsed storage mode of the stroller 10 wherein the front and rear wheels 301, 201 are arranged to lie in close proximity to one another to define a first distance D1 therebetween as shown in FIG. 1 and an unfolded position separated from rolling rear-leg unit 20 associated with an expanded use mode of stroller 10 wherein front and rear wheels 301, 201 are arranged to lie in spread-apart relation to one another to define a greater second distance D2 therebetween as shown in FIG. 4.

Juvenile seat 14 is mounted for movement with mobile base 12. Any suitable juvenile seat may be used.

Foot-actuated base opener 16 includes a spreader mover 50 including a first foot pedal FP1 and a leg spreader 40. Leg spreader 40 is coupled to the rolling rear-leg unit 20, the rolling front-leg unit 30, and the spreader mover 50 for movement relative to each of the rolling rear-leg and front-leg units 20, 30 between a drawn-together leg position shown in FIG. 1 and associated with the collapsed storage mode of the stroller 10 and a spread-apart leg position shown in FIGS. 3 and 4 and associated with the expanded use mode of the stroller 10.

Spreader mover 50 further includes pedal-support means 500 for moving the leg spreader 40 relative to the rear and front wheels 201, 301 from the drawn-together leg position to the spread-apart leg position to unfold rolling front-leg unit 30 of mobile base 12 and move front wheel 301 of rolling front-leg unit 30 away from rear wheel 201 of rolling rear-leg unit 20 in response to application of a downward force F to the foot pedal FP1. This causes rolling front-leg unit 30 to be moved from the folded position alongside rolling rear-leg unit 20 to the unfolded position separated from rolling rear-leg unit 20 as suggested in FIGS. 1-3.

Stroller 10 also includes a handle-mover linkage 17 that is configured to provide means for moving push handle 15 automatically from a stowed position alongside rolling rear-leg unit 20 shown, for example, in FIG. 1 to a deployed position above rolling rear-leg unit 20 shown, for example, in FIG. 4 in response to movement of rolling front-leg unit 30 from the folded position alongside rolling rear-leg unit 30 to the unfolded position separated from rolling rear-leg unit. Handle-mover linkage 17 is coupled to push handle 15 and mobile base 12 in illustrative embodiments of the present disclosure.

Leg spreader 40 includes a leg driver 41 comprising a rear leg driver 42 and a front leg driver 43 and a coupling 44 associated with leg driver 41 as suggested in FIG. 8. Leg driver 41 is arranged to move relative to each of rolling front-leg and rear-leg units 30, 20 during change of stroller 10 from the collapsed storage mode to the expanded use mode. Coupling 44 is configured to provide pivot means for pivotably coupling leg driver 41 to each of the rolling front-leg unit 30, rolling rear-leg unit 20, and pedal-support means 500 to cause rolling front-leg unit 30 to pivot about a leg-pivot axis 12A relative to leg driver 41 to move from the folded position alongside rolling rear-leg unit 20 to the unfolded position separated from rolling rear-leg unit 20 in response to application of the downward force F to the foot pedal FP included in the spreader mover. The pedal-support means 500 is arranged to locate the foot pedal FP below juvenile seat 14 and the pivot means 44 and above ground G underlying the front and rear wheels 301, 201 upon movement of rolling front-leg unit 30 to the unfolded position.

Spreader mover 50 further includes spring means 60 for yieldably urging the pedal-support means 500 to move relative to leg driver 41 from an extended position separated from rolling rear-leg unit 20 and arranged to define an included angle therebetween of greater than 20° to a retracted position arranged to lie alongside rolling rear-leg unit 20 as suggested in FIGS. 1-3. Spring means 60 is configured to cause leg driver 41 to remain in the retracted position until a downward force F in excess of a predetermined amount is applied by a caregiver to the foot pedal FP to cause the pedal-support means 500 to pivot about an axis and move away from rolling rear-leg unit 20.

A collapsible stroller 210 in accordance with another embodiment of the present disclosure includes a mobile base 212, a foot-actuated base opener 216, and a handle-mover linkage 217 as suggested diagrammatically in FIG. 9. Mobile base 212 includes a rolling rear-leg unit 20 and a rolling front-leg unit 30 arranged to move relative to rolling rear-leg unit 20 from a folded position located alongside rolling rear-leg unit 20 and associated with a collapsed storage mode of the collapsible stroller 210 to an unfolded position located apart from rolling rear-leg unit 20 and associated with an expanded use mode of the collapsible stroller 210. Foot-actuated base opener 216 is formed to provide means for moving rolling front-leg unit 20 away from rolling rear-leg unit 20 from the folded position to the unfolded position to unfold mobile base 212 in response to application of a downward force to a foot pedal FP included in the foot-actuator base opener 216 to move foot pedal FP closer to the ground underlying mobile base 212 so that the collapsible stroller 210 changes from the collapsed storage mode to the expanded use mode.

Foot-actuated base opener 216 includes a leg spreader 240 and a spreader mover 250 associated with leg spreader 240. Leg spreader 240 comprises a leg driver 241 and a coupling 244 as suggested in FIG. 9. Coupling 244 is linked to rolling rear-leg unit 20, rolling front-leg unit 30, and leg driver 241 as suggested in FIG. 9.

Leg driver 241 cooperates with coupling 244 to provide leg-spreader means 240 for moving the rolling front-leg unit 30 from the folded position alongside rolling rear-leg unit 20 to the unfolded position apart from rolling rear-leg unit 20 in response to downward movement of foot pedal FP. In illustrative embodiments, rolling front-leg unit 30 is pivoted about a leg-pivot axis during movement from the folded position to the unfolded position.

In illustrative embodiments, leg-spreader means 240 includes a front-leg driver 243 coupled to the rolling front-leg unit 20 and a rear-leg driver 242 coupled to rolling rear-leg unit 20. Front-leg driver 243 is pivotably coupled to rear-leg driver 242 for relative pivotable movement about a shared pivot axis during movement of rolling front-leg unit 30 between the folded and unfolded positions. Rolling front-leg unit 30 is pivotably coupled to rolling rear-leg unit 20 at the leg-pivot axis. Spreader mover 250 is coupled to one of the front-leg and rear-leg drivers 243, 242 to position foot pedal FR to lie in spaced-apart relation to the leg-pivot axis.

Spreader mover 250 is coupled to the leg-spreader means 240 for pivotable movement about a pivot axis between a ready-to-use retracted position alongside rolling rear-leg unit 20 and a downwardly extending actuated position placing foot pedal FP in closer proximity to the ground underlying mobile base 212. Foot-actuated base opener 216 further includes a pedal-return spring 260 coupled to spreader mover 250 and configured to provide torsion means for yieldably applying a torque to spreader mover 250 to pivot spreader mover 250 about a pivot axis from the downwardly extending actuated position to a ready-to-use retracted position so that foot pedal FP is arranged to receive the downward force to move foot pedal FP closer to the ground and cause mobile base 212 to unfold. Foot pedal FP is coupled to coupling 244 of leg spreader 240 by a pedal support 500 included in spreader mover 250.

The invention claimed is:

1. A collapsible stroller comprising
a mobile base including a rolling rear-leg unit having a rear wheel and a rolling front-leg unit having a front wheel and being mounted for folding movement relative to the rolling rear-leg unit between a folded position alongside the rolling rear-leg unit and associated with a collapsed storage mode of the stroller wherein the front and rear wheels are arranged to lie in close proximity to one another to define a first distance therebetween and an unfolded position separated from the rolling rear-leg unit associated with an expanded use mode of the stroller wherein the front and rear wheels are arranged to lie in spread-apart relation to one another to define a greater second distance therebetween,
a juvenile seat mounted for movement with the mobile base, and
a foot-actuated base opener including
a spreader mover including a first foot pedal and
a leg spreader coupled to the rolling rear-leg unit, the rolling front-leg unit, and the spreader mover for movement relative to each of the rolling rear-leg and front-leg units between a drawn-together leg position associated with the collapsed storage mode of the stroller and a spread-apart leg position associated with the expanded use mode of the stroller,
wherein the spreader mover further includes pedal-support means for moving the leg spreader relative to the rear and front wheels from the drawn-together leg position to the spread-apart leg position to unfold the rolling front-leg unit of the mobile base and move the front wheel of the rolling front-leg unit away from the rear wheel of the rolling rear-leg unit in response to application of a downward force to the first foot pedal so that the rolling front-leg unit is moved from the folded position alongside the rolling rear-leg unit to the unfolded position separated from the rolling rear-leg unit.

2. The collapsible stroller of claim 1, wherein the leg spreader includes a leg driver arranged to move relative to each of the rolling front-leg and rear-leg units during change of the stroller from the collapsed storage mode to the expanded use mode and pivot means for pivotably coupling the leg driver to each of the rolling front-leg unit, rolling rear-leg unit, and the pedal-support means to cause the rolling front-leg unit to pivot about an axis relative to the leg driver to move from the folded position alongside the rolling rear-leg unit to the unfolded position separated from the rolling rear-leg unit in response to application of the downward force to the first foot pedal included in the spreader mover.

3. The collapsible stroller of claim 2, wherein the pedal-support means is arranged to locate the first foot pedal below the juvenile seat and the pivot means and above ground underlying the front and rear wheels upon movement of the rolling front-leg unit to the unfolded position.

4. The collapsible stroller of claim 2, wherein the spreader mover further includes spring means for yieldably urging the pedal-support means to move relative to the leg driver from an extended position separated from the rolling rear-leg unit and arranged to define an included angle therebetween of greater than 20° to a retracted position arranged to lie alongside the rolling rear-leg unit until a downward force in excess of a predetermined amount is applied to the first foot pedal to cause the pedal-support means to pivot about an axis and move away from the rolling rear-leg unit.

5. The collapsible stroller of claim 1, wherein the leg spreader includes a leg driver arranged to move relative to each of the rolling front-leg and rear-leg units during change of the stroller from the collapsed storage mode to the expanded use mode and pivotably coupled to each of the rolling front-leg unit, rolling rear-leg unit, and pedal-support means to cause the rolling front-leg unit to pivot about an axis relative to the leg driver from the folded position alongside the rolling rear-leg unit to the unfolded position separated from the rolling rear-leg unit in response to application of the downward force to the first foot pedal.

6. The collapsible stroller of claim 1, wherein the leg spreader includes a leg driver arranged to move relative to each of the rolling front-leg and rear-leg units during change of the stroller from the collapsed storage mode to the expanded use mode and pivot means for pivotably coupling the leg driver to each of the rolling front-leg unit, rolling rear-leg unit, and the pedal-support means to cause the rolling front-leg unit to pivot about an axis relative to the leg driver to move from the folded position alongside the rolling rear-leg unit to the unfolded position separated from the rolling rear-leg unit in response to application of the downward force to the first foot pedal included in the spreader mover.

7. The collapsible stroller of claim 1, wherein the leg spreader includes a leg driver arranged to move relative to each of the rolling front-leg and rear-leg units during change of the stroller from the collapsed storage mode to the expanded use mode and pivotably coupled to each of the rolling front-leg unit, rolling rear-leg unit, and pedal-support means to cause the rolling front-leg unit to pivot about an axis relative to the leg driver from the folded position alongside the rolling rear-leg unit to the unfolded position separated from the rolling rear-leg unit in response to application of the downward force to the first foot pedal.

8. The collapsible stroller of claim 1, wherein the leg driver includes a rear-leg driver pivotably coupled to the rolling rear-leg unit for pivotable movement about a rear pivot axis and a front-leg driver pivotably coupled to the rolling front-leg unit for pivotable movement about a front pivot axis and pivotably coupled to the rolling rear-leg driver for pivotable movement about a middle pivot axis.

9. The collapsible stroller of claim 8, wherein the pedal-support means is coupled to the leg spreader at the middle pivot axis and the middle pivot axis is arranged to move downwardly toward ground underlying the juvenile seat in response to application of the downward force to the first foot pedal.

10. The collapsible stroller of claim 9, further comprising a pedal-return spring coupled to the leg driver and the pedal-support means and arranged to apply a torque to the pedal-support means to urge the first foot pedal normally and yieldably to assume a ready-to-use retracted position alongside the rolling rear-leg unit when the stroller is in the expanded use mode.

11. The collapsible stroller of FIG. 8, wherein the spreader mover further includes a second foot pedal, the pedal-support means includes a first arm having an upper portion pivotably coupled to the leg driver at the middle pivot axis and a lower portion coupled to the first foot pedal to move therewith, a second arm having an upper portion pivotably coupled to the leg driver at the middle pivot axis and a lower portion coupled to the second foot pedal, and a center strut interconnecting the first and second arms to move therewith about the middle pivot axis.

12. The collapsible stroller of claim 8, wherein the rolling front-leg unit is coupled to the rolling rear-leg unit for pivotable movement about a single horizontal leg-pivot axis between the folded and unfolded positions and the single horizontal pivot axis is arranged to lie in substantially spaced-apart parallel relation to each of the front, middle, and rear pivot axes.

13. The collapsible stroller of claim 12, wherein the front and rear pivot axes are arranged to lie below and in spaced-apart location to the single horizontal leg-pivot axis to locate the middle pivot axis therebetween when the rolling front-leg unit is positioned to lie in the folded position in the collapsed storage mode of the stroller and the front, middle, and rear pivot axes are arranged to lie below the single horizontal leg-pivot axis and in substantially coplanar relation to one another when the rolling front-leg unit is positioned to lie in the unfolded position in the expanded use mode of the stroller.

14. The collapsible stroller of claim 8, wherein each of the front-leg and rear-leg drivers includes an outer portion and an opposite inner portion, the outer portion of the front-leg driver is coupled to the rolling front-leg unit for pivotable movement about the front pivot axis, the outer portion of the rear-leg driver is coupled to the rolling rear-leg unit for pivotable movement about the rear pivot axis, and the inner portions of the front-leg and rear-leg drivers are coupled to one another for pivotable movement about the middle pivot axis.

15. A collapsible stroller comprising
a mobile base including a rolling rear-leg unit and a rolling front-leg unit arranged to move relative to the rolling rear-leg unit from a folded position located alongside the rolling rear-leg unit and associated with a collapsed storage mode of the collapsible stroller to an unfolded position located apart from the rolling rear-leg unit and associated with an expanded use mode of the collapsible stroller, and
a foot-actuated base opener formed to provide means for moving the rolling front-leg unit away from the rolling rear-leg unit from the folded position to the unfolded position to unfold the mobile base in response to application of a downward force to a foot pedal included in the foot-actuator base opener to move the foot pedal closer to ground underlying the mobile base so that the collapsible stroller changes from the collapsed storage mode to the expanded use mode.

16. The collapsible stroller of claim 15, wherein the rolling front-leg unit is arranged to pivot about a leg-pivot axis during movement of the rolling front-leg unit from the folded position to the unfolded position and the foot-actuated base opener includes a spreader mover located below the leg-pivot axis and leg-spreader means for pivoting the rolling front-leg unit about the leg-pivot axis from the folded position alongside the rolling rear-leg unit to the unfolded position apart from the rolling rear-leg unit in response to downward movement of the foot pedal away from the leg-pivot axis.

17. The collapsible stroller of claim 16, wherein the leg-spreader means includes a front-leg driver coupled to the rolling front-leg unit and a rear-leg driver coupled to the rolling rear-leg unit and the front-leg driver is pivotably coupled to the rear-leg driver for relative pivotable movement about a shared pivot axis during movement of the rolling front-leg unit between the folded and unfolded positions.

18. The collapsible stroller of claim 17, wherein the rolling front-leg unit is pivotably coupled to the rolling rear-leg unit at the leg-pivot axis and the spreader mover is coupled to one of the front-leg and rear-leg drivers to position the foot pedal to lie in spaced-apart relation to the leg-pivot axis.

19. The collapsible stroller of claim 16, wherein the spreader mover is coupled to the leg-spreader means for pivotable movement about a pivot axis between a ready-to-use retracted position alongside the rolling rear-leg unit and a downwardly extending actuated position placing the foot pedal in closer proximity to ground underlying the mobile base and the foot-actuated base opener further includes a pedal-return spring coupled to the spreader mover and configured to provide torsion means for yieldably applying a torque to the spreader mover to pivot the spreader mover about the pivot axis from the downwardly extending actuated position to a ready-to-use retracted position so that the foot pedal is arranged to receive the downward force to move the foot pedal closer to the ground and cause the mobile base to unfold.

* * * * *